United States Patent
Erhart et al.

(10) Patent No.: US 8,244,531 B2
(45) Date of Patent: Aug. 14, 2012

(54) METHOD OF RETAINING A MEDIA STREAM WITHOUT ITS PRIVATE AUDIO CONTENT

(75) Inventors: George William Erhart, Loveland, CO (US); Valentine C. Matula, Granville, OH (US); David Joseph Skiba, Golden, CO (US); Lawrence O'Gorman, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 929 days.

(21) Appl. No.: 12/239,798

(22) Filed: Sep. 28, 2008

(65) Prior Publication Data

US 2010/0082342 A1  Apr. 1, 2010

(51) Int. Cl.
*G10L 17/00* (2006.01)

(52) U.S. Cl. ..... 704/249; 704/245; 704/246; 379/88.01; 379/88.16; 379/88.18; 370/352; 370/355; 705/57

(58) Field of Classification Search ............ 704/246, 704/215, 245, 249; 379/88.01, 88.13, 88.16, 379/88.18; 370/352, 355, 401, 442, 486, 370/354; 705/57; 709/231; 340/531, 506
See application file for complete search history.

(56) References Cited

U.S. PATENT DOCUMENTS

| | | | | | |
|---|---|---|---|---|---|
| 5,420,866 | A | * | 5/1995 | Wasilewski | 370/426 |
| 5,732,394 | A | * | 3/1998 | Nakadai et al. | 704/255 |
| 5,897,616 | A | * | 4/1999 | Kanevsky et al. | 704/246 |
| 6,014,427 | A | * | 1/2000 | Hanson et al. | 379/67.1 |
| 7,158,026 | B2 | * | 1/2007 | Feldkamp et al. | 340/531 |
| 7,502,741 | B2 | * | 3/2009 | Finke et al. | 704/270 |
| 7,664,056 | B2 | * | 2/2010 | Dye et al. | 370/260 |
| 7,778,397 | B2 | * | 8/2010 | Erhart et al. | 379/88.14 |
| 7,847,813 | B2 | * | 12/2010 | Erhart et al. | 348/14.01 |
| 2002/0120859 | A1 | | 8/2002 | Lipkin et al. | |
| 2003/0046554 | A1 | * | 3/2003 | Leydier et al. | 713/186 |
| 2004/0181679 | A1 | * | 9/2004 | Dettinger et al. | 713/193 |
| 2004/0246822 | A1 | | 12/2004 | Wong | |
| 2005/0034098 | A1 | | 2/2005 | DeSchryver et al. | |
| 2005/0235163 | A1 | | 10/2005 | Forlenza et al. | |
| 2005/0240659 | A1 | | 10/2005 | Taylor | |
| 2006/0289622 | A1 | | 12/2006 | Khor et al. | |
| 2007/0016419 | A1 | * | 1/2007 | Lee et al. | 704/250 |
| 2009/0022305 | A1 | * | 1/2009 | Chavez et al. | 379/388.03 |

FOREIGN PATENT DOCUMENTS

| | | |
|---|---|---|
| WO | 2007009028 A2 | 1/2007 |
| WO | 2008002587 A2 | 1/2008 |

OTHER PUBLICATIONS

Reynolds, Ryan, "CA Application No. 2,646,118 Office Action Mar. 23, 2011", , Publisher: CIPO, Published in: CA. Barbelanne, Alain, "EP Application No. 06844564.2-1249 / 1955147 European Search Report Dec. 11, 2009", , Publisher: EPO, Published in: EP.
Chetry, Nicolas, "EP Application No. 08 17 2702.6-2225 European Search Report", , Publisher: EPO, Published in: EP.

* cited by examiner

*Primary Examiner* — Vijay B Chawan (57) ABSTRACT

A method is disclosed that enables the handling of audio streams for segments in the audio that might contain private information, in a way that is more straightforward than in some techniques in the prior art. The data-processing system of the illustrative embodiment receives a media stream that comprises an audio stream, possibly in addition to other types of media such as video. The audio stream comprises audio content, some of which can be private in nature. Once it receives the data, the data-processing system then analyzes the audio stream for private audio content by using one or more techniques that involve looking for private information as well as non-private information. As a result of the analysis, the data-processing system omits the private audio content from the resulting stream that contains the processed audio.

20 Claims, 7 Drawing Sheets

Figure 7

METHOD OF RETAINING A MEDIA STREAM WITHOUT ITS PRIVATE AUDIO CONTENT

FIELD OF THE INVENTION

The present invention relates to telecommunications in general, and, more particularly, to omitting private audio information from a media stream.

BACKGROUND OF THE INVENTION

A contact center of a business enterprise records call data for a variety of purposes such as assessment of agent performance, system analysis, analytics processing, and so forth. Typically, when a contact center records calls, the contact center records the entire audio of the call. Depending on the nature of the call or of the business supported by the contact center, there might be private information exchanged during the call. The information might be private information spoken by the caller such as social security number, bank account number, phone number, and so forth. In addition, there might be proprietary information spoken by the agent such as transaction information, account balance, birth date, and so forth.

A problem arises once the recording of the call's media stream is written to non-volatile memory and saved. Once the recording is saved, the business enterprise has a responsibility to keep the saved data private and secure. In addition, authorized third parties might be required to have access to the saved call data, for purposes such as to enable contact center performance analysis, analytics model development, training, and so forth. Therefore, in order to share the call recordings and reduce the enterprise's liability, special handling of the private, proprietary segments of the call is necessary.

Currently, the most popular approach is to manually remove the private audio segments of each call. The manual process involves a person listening to each call and removing the segments that are deemed to contain private information. The private segments of the scrutinized media file are commonly replaced with a single tone or silence. The new media recording is then saved with all of the private sections replaced by the silence or tone.

An alternative approach to removing the private information is to encrypt the entire file. This does safeguard privacy when encrypted, but privacy is no longer maintained when the audio files are played.

Yet another approach that is also in use is not to record the call data at all. This approach avoids all of the complications and responsibilities that are associated with recording the data. However, the benefits of training and better analytics systems are never realized.

Therefore, what is needed is a technique to process a media stream that comprises private audio content, without some of the disadvantages in the prior art.

SUMMARY OF THE INVENTION

The present invention enables the handling of audio streams for segments in the audio that might contain private information, in a way that is more straightforward than in some techniques in the prior art. The data-processing system of the illustrative embodiment receives a media stream that comprises an audio stream, possibly in addition to other types of media such as video. The audio stream comprises audio content, some of which can be private in nature. Once it receives the data, the data-processing system then extracts the audio stream from the media stream received, if not already extracted. It then analyzes the audio stream for private audio content. In doing so, the data-processing system uses models that describe the privacy information to be removed. It then omits the private audio content from the resulting stream that contains the processed audio.

The analysis itself consists of one or more techniques of the illustrative embodiment. In the first technique, the data-processing system looks for and alters those segments that contain private data. In the second technique, the system looks for and retains segments with non-private information, in contrast to looking for segments with private information. Two variations of the second technique involve i) retaining prose that contains only non-private information or ii) producing an acoustic signature without intelligible prose, or both. As those who are skilled in the art will appreciate, other variations of the disclosed techniques are possible.

In accordance with the illustrative embodiment, an audio stream to be analyzed conveys i) a caller speech waveform that is produced by a caller who is talking with an agent during a call, and ii) an agent speech waveform that is produced by the agent who is talking with the caller during the call. However, it will be clear to those are skilled in the art, after reading this specification, how to make and use alternative embodiments in which other types of speech waveform sources can be analyzed, such as people who have a relationship other than that of "caller" and "agent," or no apparent relationship at all. Furthermore, in some alternative embodiments, waveforms that are originated by non-human speech sources can be analyzed, such as one produced by an interactive voice response (IVR) system. Lastly, in some alternative embodiments, the audio stream to be processed can originate from something other than a call.

The illustrative embodiment of the present invention comprises a method for omitting private audio content from an audio stream, comprising: receiving the audio stream, at a data-processing system, the audio stream conveying i) a first speech waveform produced by a first party on a call, and ii) a second speech waveform produced by a second party on the call; determining whether a first segment of the first speech waveform comprises private information, based the content of i) a second segment of the first speech waveform that precedes the first segment, or ii) a predetermined segment of the second speech waveform; and tagging the first segment when the first segment is determined to comprise private information.

DETAILED DESCRIPTION

Figure 1:
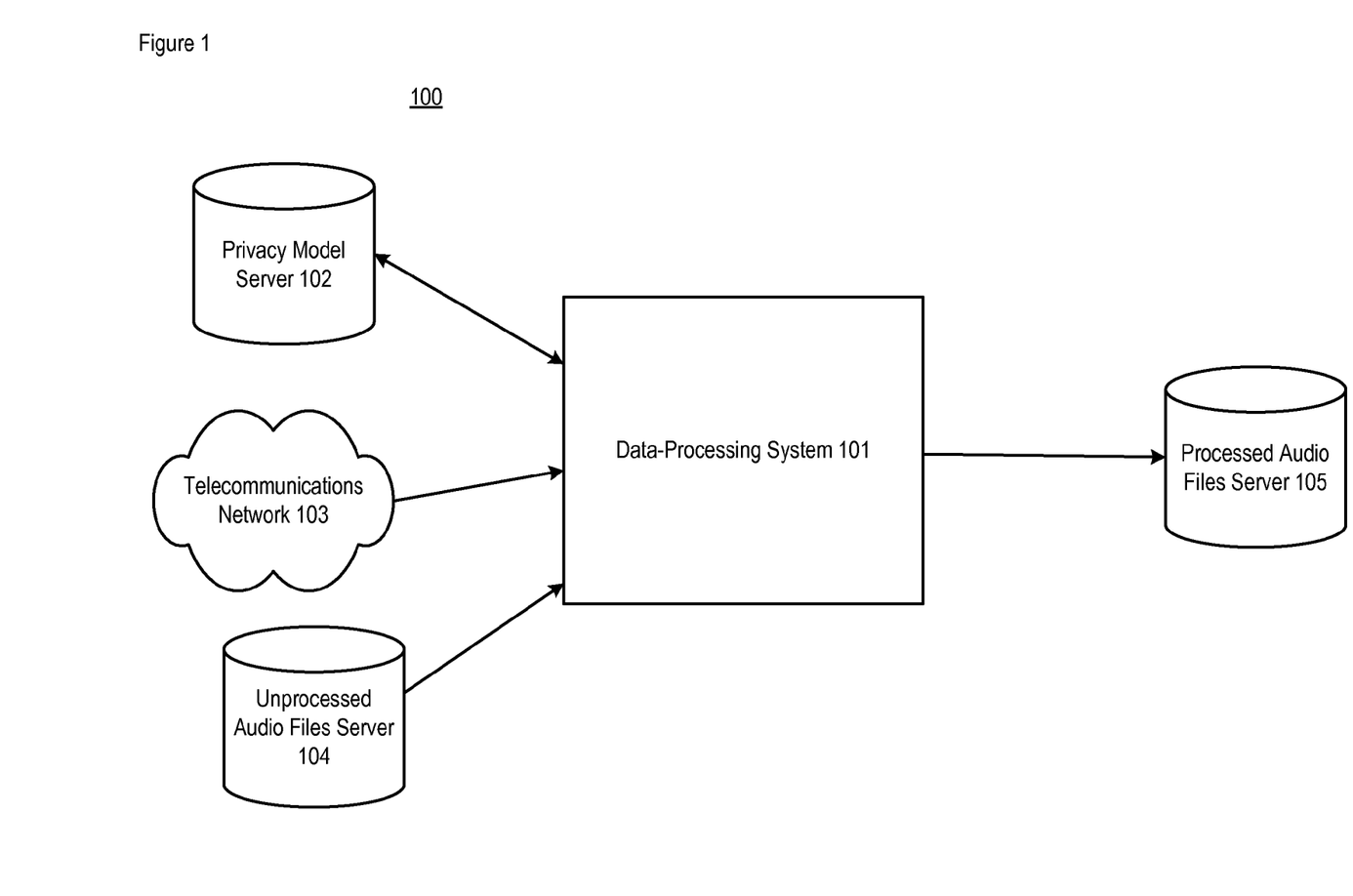
FIG. 1 depicts a schematic diagram of private-information processing environment 100, in accordance with the illustrative embodiment of the present invention.

FIG. 1 depicts a schematic diagram of private-content processing environment 100, in accordance with the illustrative embodiment of the present invention. Processing environment 100 comprises data-processing system 101, privacy model server 102, telecommunications network 103, unprocessed audio files server 104, and processed audio files server 105, interconnected as shown.

Data-processing system 101 is a computer-based system that is capable of receiving signals, processing those signals, and outputting the processed signals. The salient tasks that system 101 executes in processing the data is described in detail below and with respect to FIGS. 2 through 7.

In accordance with the illustrative embodiment, system 101 receives a media stream that comprises an audio stream, possibly in addition to other types of media such as video. The audio stream comprises audio content, some of which can be private in nature. System 101 receives the media stream, either as a live stream or as a prerecorded stream. For example, system 101 can be provided a live feed via network 103, which might be networked into a Voice over IP contact center or other source of a live media stream. As another example, system 101 can access a prerecorded stream from a source such as server 104 or other type of data storage device. In accordance with the illustrative embodiment, the format of the media stream that is received is in the Real-Time Protocol (RTP) format. As those who are skilled in the art will appreciate, however, system 101 can operate on data from other types of sources and on data that is represented in other formats.

In accordance with the illustrative embodiment, an audio stream to be analyzed conveys i) a caller speech waveform that is produced by a caller who is talking with an agent during a call, and ii) an agent speech waveform that is produced by the agent who is talking with the caller during the call. However, it will be clear to those are skilled in the art, after reading this specification, how to make and use alternative embodiments in which other types of speech waveform sources can be analyzed, such as people who have a relationship other than that of "caller" and "agent," or no apparent relationship at all. Furthermore, in some alternative embodiments, waveforms that originate from non-human speech sources can be analyzed, such as one produced by an interactive voice response (IVR) system. Lastly, in some alternative embodiments, the audio stream to be processed can originate from something other than a call.

Once it receives the data, system 101 then extracts the audio stream from the media stream received, if not already extracted. System 101 then analyzes the audio stream for private audio content. In some embodiments, system 101 uses models that describe the privacy information to be removed, such as privacy models stored at server 102. System 101 then omits the private audio content from the resulting stream that it retains or transfers to another system such as server 105.

FIGS. 2 through 7 depict flowcharts of the salient tasks associated with the operation of the illustrative embodiment of the present invention. As those who are skilled in the art will appreciate, in some alternative embodiments, only a subset of the depicted tasks is performed. In some other alternative embodiments, at least some of the tasks are performed simultaneously or in a different order from that depicted.

Figure 2:
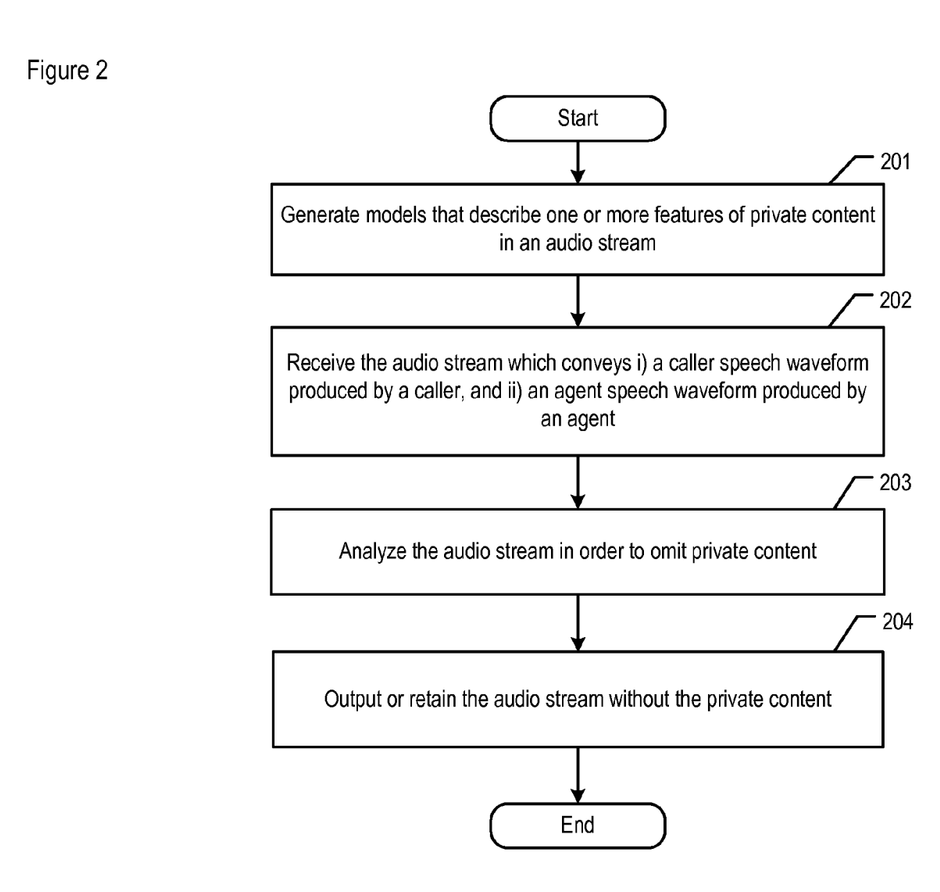
FIG. 2 depicts a flowchart of the salient tasks associated with the operation of the illustrative embodiment of the present invention.

Referring to FIG. 2, at task 201, data-processing system 101 generates or obtains models that describe one or more features of private content that might be in an audio stream. The models have to be created, either by system 101 or by another means ahead of time, in order to define the private information to omit. The models can be based on standard spoken representation of data such as passwords, mailing addresses, medications taken, social security numbers, telephone numbers, account numbers, bank balances, dollar amounts, and so forth.

The particular representation of each privacy model can be based on keywords or key phrases, or on acoustic signatures. If the representation is based on keywords or phrases, the actual words that are associated with private information are stored, such as "address," "medication," and "password". If the representation is based on acoustic signatures, in which the actual prose is not stored but the non-prose-related characteristics of speech are stored, then the privacy models can be created generically. For example, the number of syllables in "mother's maiden name" is constant, regardless of who actually utters the phrase.

Another technique that utilizes acoustic signatures is to record particular agents uttering these phrases and to create the privacy models based on the prosody of the utterances. The "prosody" is the rhythm, stress, and intonation of speech. Subsequently, the created models can be used for the specific agent who is associated with the particular audio stream to be analyzed. Prosody, as those who are skilled in the art will appreciate, can also be used for identifying phrases uttered by callers. Such phrases include, for example, the callers' social security numbers and telephone numbers. Identification is possible due to the regular patterns of certain strings of numbers, in which a caller's speech produces a pattern that is identifiable, even though the digits (or characters) spoken are different for the different callers or agents.

As those who are skilled in the art will appreciate, in some alternative embodiments, privacy models can be created by using other techniques than those already described.

If data-processing system 101 has initialized the privacy models, instead of having obtained them from another source, system 101 can write those initialized models back to server 102 for later use.

At task 202, data-processing system 101 receives the media stream from which private audio content is to be omitted. As described earlier, media stream to be analyzed comprises an audio stream that conveys one or more waveforms. The first waveform is a caller speech waveform (i.e., a "first" speech waveform) that is produced by a caller (i.e., a "first party" on a call) who is talking with an agent. The second waveform is an agent speech waveform (i.e., a "second" speech waveform) that is produced by the agent (i.e., a "second party" on the call) who is talking with the caller. The audio stream can be part of a live media stream—for example, from a VoIP contact center—or part of prerecorded media files.

In accordance with the illustrative embodiment, the multiple waveforms (e.g., caller speech waveform, agent speech waveform, etc.) are speech signals from different sources that are present in the same prerecorded media file. However, it will be clear to those skilled in the art, after reading this specification, how to make and use alternative embodiments in which the speakers' waveforms are stored, or otherwise represented, in separate media files and are processed accordingly.

At task 203, data-processing system 101 analyzes the audio stream, in order to omit its private content. Task 203 is described below and with respect to FIG. 3.

At task 204, data-processing system 101 outputs, or at least retains, a resulting stream that is a representation of the audio stream without its private content.

FIG. 2, as depicted, represents data-processing system 101 as operating on a single audio stream at a time and then stopping, at least until system 101's processing is invoked again to operate on another audio stream. It will be clear to those who are skilled in the art, however, how to make and use alternative embodiments in which system 101 continuously executes the depicted tasks for successive audio streams or for successive portions of the same audio stream.

Figure 3:
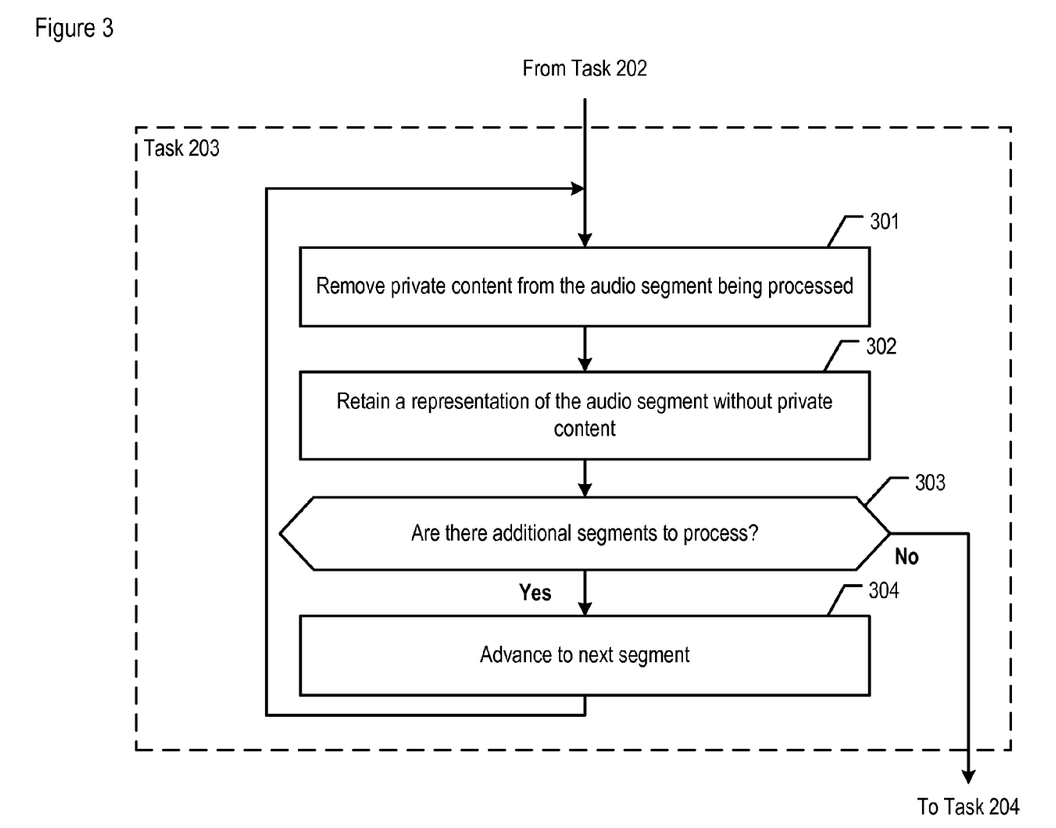
FIG. 3 depicts a flowchart of the salient tasks associated with the performance of task 203 in accordance with of the illustrative embodiment of the present invention.

FIG. 3 depicts a flowchart of the salient tasks associated with the performance of task 203 in accordance with of the illustrative embodiment of the present invention. The depicted tasks operate on one or more segments of the caller waveform or of the agent waveform conveyed by the audio stream received at task 202.

At task 301, data-processing system 101 removes the private content from the segment being processed. Task 301 is described below and with respect to FIG. 4.

At task 302, data-processing system 101 retains a representation of the audio segment being processed, which can be i) the actual segment without private information or ii) an acoustic signature or the segment or of the entire audio stream, in which the acoustic signature is absent of any intelligible prose. Task 302 is described below and with respect to FIG. 5.

In accordance with the illustrative embodiment, system 101 performs both tasks 301 and 302, in order to remove private content and to retain non-private content in the audio segment being analyzed. It will be clear, however, to those skilled in the art, after reading this specification, how to make and use alternative embodiments in which either task 301 or 302 is executed, but not both, or alternative embodiments in which different combinations of tasks 301 and 302 are executed for different audio segments that are processed.

At task 303, data-processing system 101 determines whether there are additional audio segments to process. If there are, task execution proceeds to task 304. Otherwise, task execution proceeds to task 204.

At task 304, data-processing system 101 prepares to process the next audio segment—for example, by updating counters, reading the next segment into processing memory, and so forth. Task execution then proceeds back to task 301.

Figure 4:
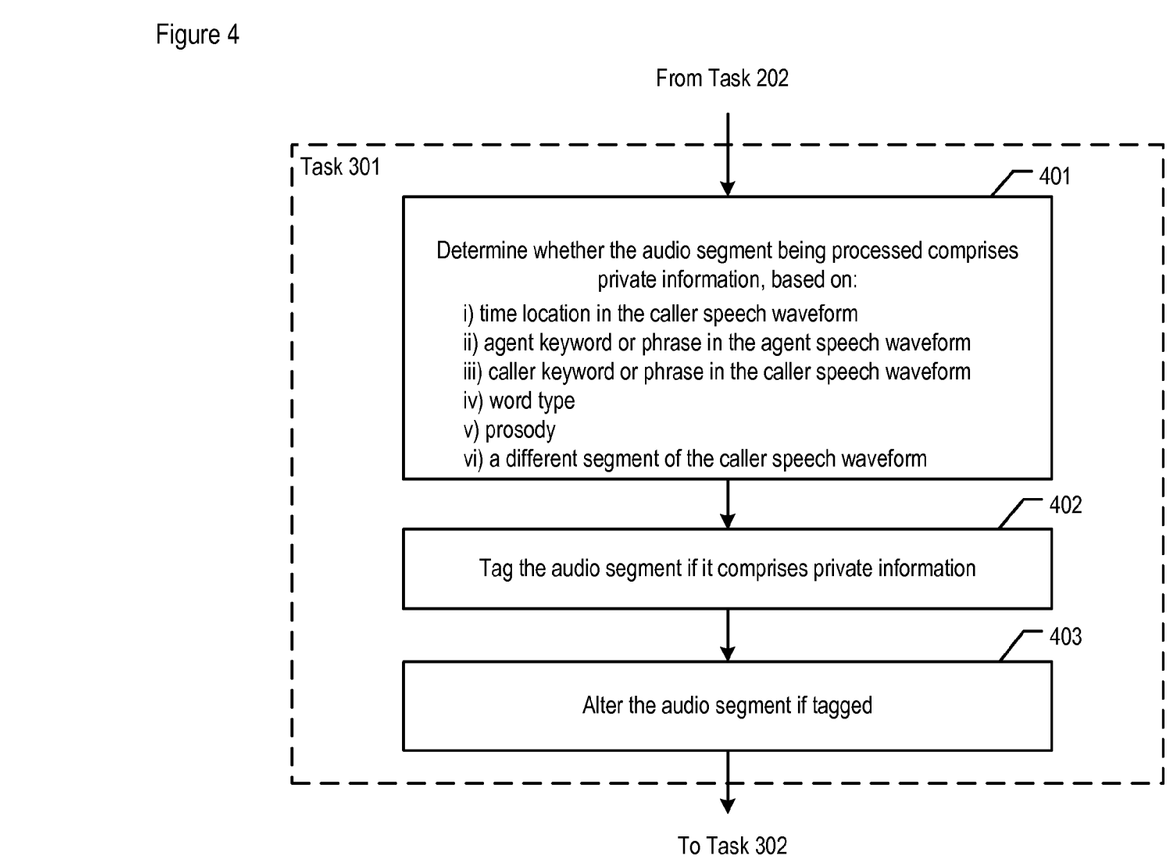
FIG. 4 depicts a flowchart of the salient tasks associated with the performance of task 301 in accordance with of the illustrative embodiment of the present invention.

FIG. 4 depicts a flowchart of the salient tasks associated with the performance of task 301 in accordance with of the illustrative embodiment of the present invention.

At task 401, data-processing system determines whether the audio segment that is being processed comprises private information. In accordance with the illustrative embodiment, the determination can be accomplished in one or more of several ways such as, but not necessarily limited to, the following:

i. By time location in the caller speech waveform—This technique is based on the insight that calls are often handled in a relatively predictable way. The agent may establish the caller's identity by asking for a name, an address, a social security number, and perhaps a password or personal identification number (PIN). The caller's responses to these queries can be deemed private and automatically omitted from the processed audio stream.

The time location of the audio segment with private information can be referenced in terms of an absolute time or a relative time. The absolute time can depend on how quickly a response is made. For example, the time location might be assumed to occur immediately after the segment containing the waveform of the agent asking the question. As another example, the time interval in which the bulk of the private information is to be uttered can be assumed to occur within a predetermined part of the conversation, such as the first M seconds of the caller's speech waveform or recorded audio. In contrast, the relative time can depend on a particular audio segment's position among segments of dialog exchanged between agent and caller. For example, the time locations of audio segments with private information might be assumed to be the fifth, ninth, and tenth responses of the caller to the agent, regardless of how quickly those responses are made.

ii. By agent keyword or phrase in the agent speech waveform—If the call is less structured than assumed for technique (i) described above or if private information is requested during the body of the call, the private information can be recognized by keywords spoken by the agent. For example, if the agent says "Can you give me your address again?", this key phrase can be recognized and the response of the caller omitted or removed.

iii. By caller keyword or phrase in the caller speech waveform—When the caller's speech can be recognized, portions can also be removed from audio segments following words that indicate private information, such as "The medication I'm currently taking is . . . "

iv. By word type—In this technique, data-processing system 101 is tuned to automatically recognize when a segment of a speech waveform is of a certain type. For instance, if system 101 detects a series of numbers spoken, it can decide that "6 2 3 2 4 1 8" is a telephone number and not a combination of words and numbers, such as "6 too 3 to for won ate." Given this semantic recognition by system 101, this and any custom modeling can be used to detect and remove segments with private information.

v. By prosody—The type of speech can sometimes be recognized, for example, by its duration, number of syllables, and intonation. These are manifestations of "prosody," as discussed above and with respect to task 201. This technique works best for distinctive phrases that are relatively long, such as "social security number," a string of uttered digits that represent a social security number, and "mother's maiden name." Data-processing system 101 can search for various phrases based on their prosody and remove them accordingly.

vi. By analyzing a first audio segment to predict the private information content of a second segment—Similar to how a segment of the agent speech waveform can be used to predict that a subsequent segment of the caller speech waveform might contain private information, a first segment of the caller speech waveform can be used to predict that a second segment of the caller speech waveform might contain private information.

As those who are skilled in the art will appreciate, these methods can be used either on their own or with one or more other methods for added reliability. Furthermore, those who are skilled in the art will appreciate that one or more of these methods can be generalized for use on waveforms originating from any sources, not just from a caller and an agent in particular.

At task 402, data-processing system 101 tags the audio segment being processed if it comprises private information. In accordance with the illustrative embodiment, the tagging is performed only to identify, in a memory, which segments are to be altered or removed due to their private nature. In some alternative embodiments, the tagged audio segments are retained along with their tags, which serve to indicate that these segments comprise private information. In some other alternative embodiments, the tagging is skipped entirely before proceeding to task 403.

At task 403 of the illustrative embodiment, data-processing system 101 alters the audio segment if it has been tagged at task 402 or identified in some other way as requiring alteration. In some embodiments, the altering comprises replacing the tagged audio segment with an audible tone, while in some alternative embodiments the altering comprises replacing the tagged audio segment with silence. The tone or silence will substitute, in the processed audio stream produced, for audio segments that had contained private information in the unprocessed stream. As those who are skilled in the art will appreciate, something other than a replacement tone or silence can be used to represent audio segments that had contained private information.

Figure 5:
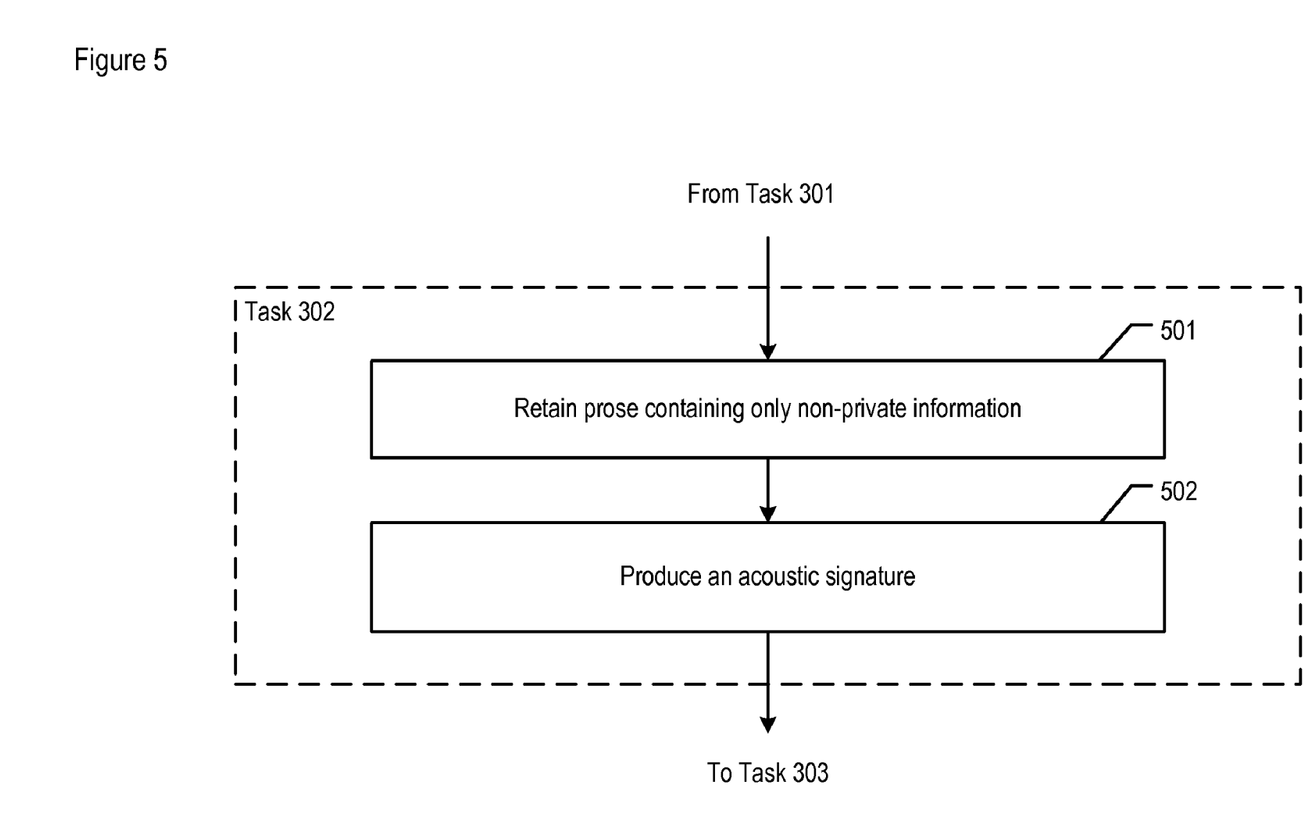
FIG. 5 depicts a flowchart of the salient tasks associated with the performance of task 302 in accordance with of the illustrative embodiment of the present invention.

FIG. 5 depicts a flowchart of the salient tasks associated with the performance of task 302 in accordance with of the illustrative embodiment of the present invention. In this task, the emphasis is on non-private information being retained, in contrast to private information being removed as was accomplished at task 301.

At task 501, in some embodiments, data-processing system 101 retains prose that contains only non-private information in the audio segment or segments being analyzed. Task 501 is described below and with respect to FIG. 6.

At task 502, in some embodiments, data-processing system 101 produces an acoustic signature, in contrast to producing the full audio of the non-private portions of calls. Task 502 is described below and with respect to FIG. 7.

In some embodiments either task 501 or 502 is performed, but not both, while in other embodiments, both tasks 501 and 502 are performed. Both tasks 501 and 502 are performed in situations in which it is important to store chosen keywords or key phrases when uttered, plus the acoustic signature of some or all of the audio stream being processed.

Figure 6:
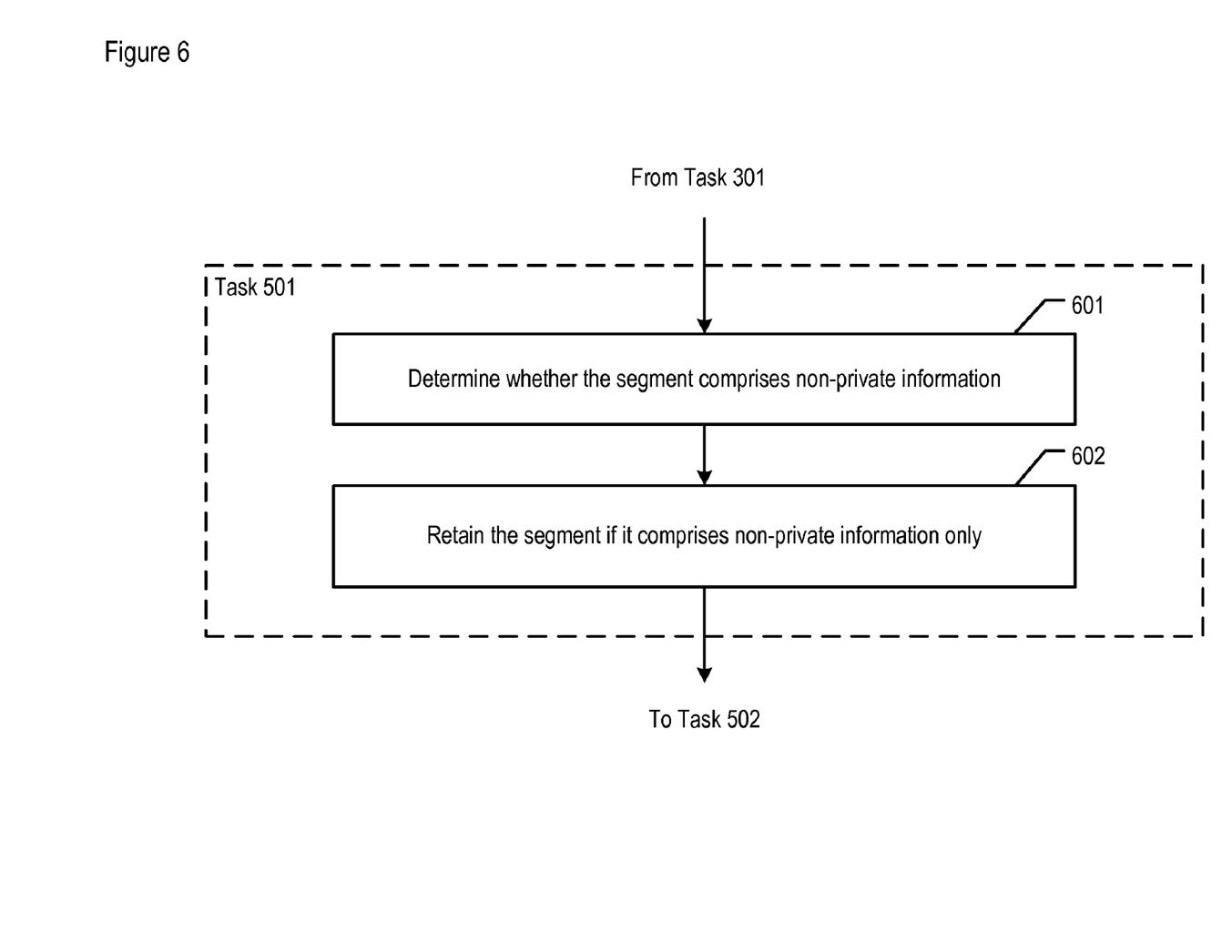
FIG. 6 depicts a flowchart of the salient tasks associated with the performance of task 501 in accordance with of the illustrative embodiment of the present invention.

FIG. 6 depicts a flowchart of the salient tasks associated with the performance of task 501 in accordance with of the illustrative embodiment of the present invention.

At task 601, data-processing system 101 determines whether the audio segment being processed comprises non-private information. Here, instead of removing private information, system 101 performs the inverse of this by retaining only non-private information, with non-private prose intact. This can be a method whose use is preferred, for example, when the amount of information of interest is relatively small, such as when it is only of interest to record the closing of the call when "thank yous" are spoken and when a call can be assessed for customer satisfaction. In this case, for example, system 101 can retain audio segments that occur within the final N seconds of the caller speech waveform or audio recording.

At task 602, data-processing system 101 retains the segment (i.e., in a memory) if it comprises non-private information only.

Figure 7:
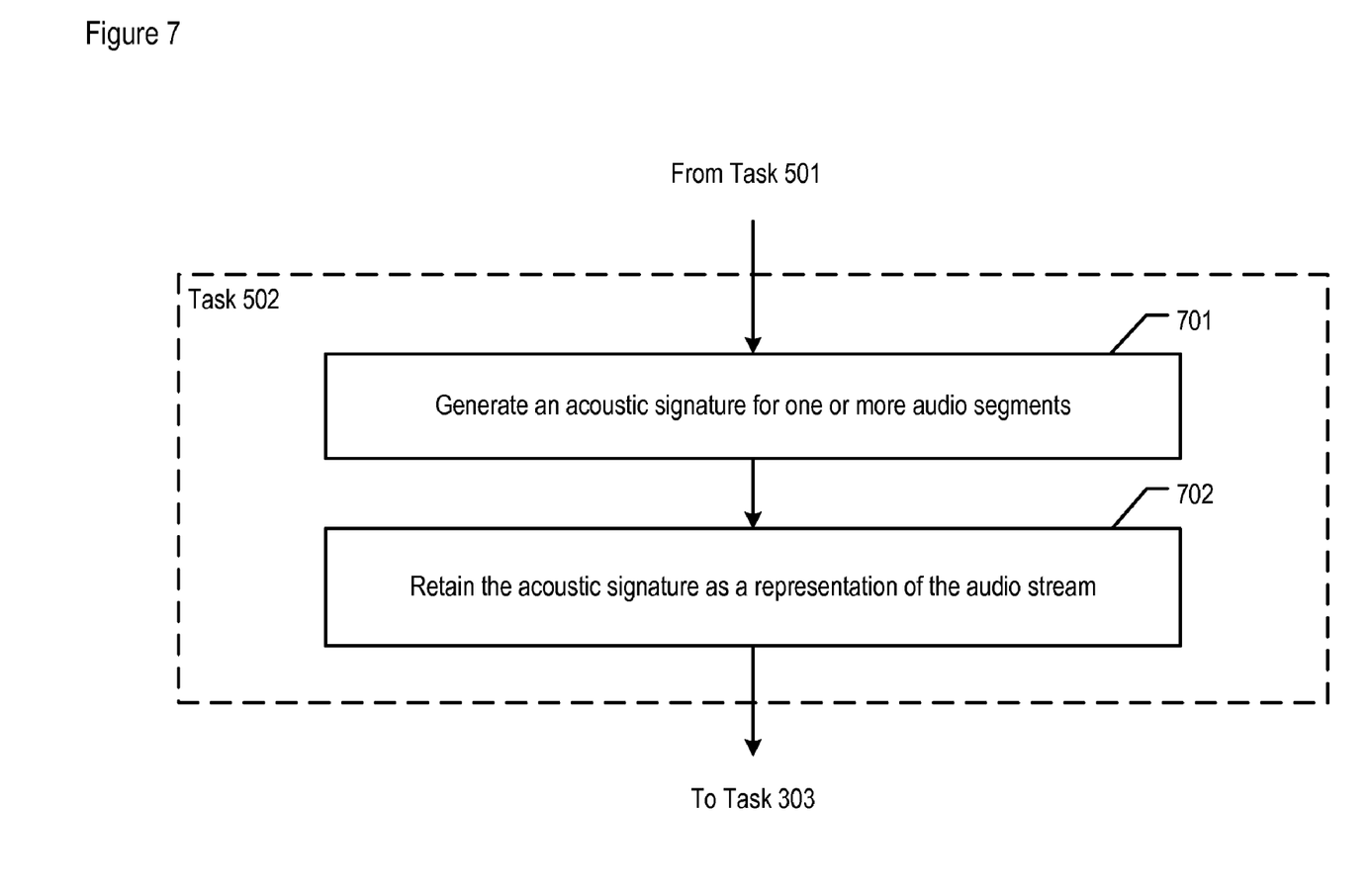
FIG. 7 depicts a flowchart of the salient tasks associated with the performance of task 502 in accordance with of the illustrative embodiment of the present invention.

FIG. 7 depicts a flowchart of the salient tasks associated with the performance of task 502 in accordance with of the illustrative embodiment of the present invention.

At task 701, data-processing system 101 generates an acoustic signature for one or more segments. Here, the acoustic signatures retain features of call length, silences, intonation, and so forth; however, the words uttered in the unprocessed waveform are eliminated and, as a result, intelligible prose is removed. System 101 accomplishes this by computing and storing features, such as pitch and energy, during the call. In some embodiments, system 101 computes and stores information (e.g., the relative intonation, etc.) on how the preserved features change throughout each segment represented. Alternatively, system 101 low-pass—filters the call, with respect to acoustic frequency, in order to remove intelligible words but to retain at least some non-prose features in the waveform.

At task 702, data-processing system 101 retains the acoustic signature (i.e., in a memory) as a representation of the audio stream that is being analyzed.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for processing audio content in an audio stream that includes private information, comprising:
   receiving the audio stream, at a data-processing system, the audio stream including a first speech waveform produced by a first party on a call, and a second speech waveform produced by a second party on the call;
   determining whether a first segment of the first speech waveform comprises private information by analyzing the audio content of a segment of the second speech waveform against a model that describes the private information, wherein the model is represented by acoustic signatures in which non-prose-related characteristics of speech are stored; and
   tagging the first segment when the first segment is determined to comprise private information.

2. The method of claim 1 wherein the determining whether the first segment of the first speech waveform comprises private information is based at least in part upon a time location of the first segment within the first speech waveform.

3. The method of claim 2 wherein the time location of the first segment is within the initial M seconds of the first speech waveform, M being a positive number that is less than the length in seconds of the first speech waveform.

4. The method of claim 1 wherein the determining whether the first segment of the first speech waveform comprises private information is based at least in part upon a prosody of the segment of the second speech waveform.

5. The method of claim 1 further comprising:
   determining whether at least one of a third segment and a fourth segment of the first speech waveform comprises non private information; and
   retaining only the third segment where the third segment, but not the fourth segment, is determined to comprise non-private information.

6. The method of claim 5 wherein the determining of the third segment is based at least in part upon a matching of the audio content of the third segment with at least one of a keyword and a key phrase.

7. The method of claim 5 wherein the determining of the third segment is based at least in part upon a time location of the third segment within the first speech waveform.

8. The method of claim 7 wherein the time location of the third segment is within the final N seconds of the first speech waveform, N being a positive number that is less than the length in seconds of the first speech waveform.

9. The method of claim 1 further comprising altering the first segment when tagged.

10. The method of claim 9 wherein the altering comprises substituting a tone in place of the first segment.

11. The method of claim 9 wherein the altering comprises substituting silence in place of the first segment.

12. A method for processing private audio content in an audio stream, comprising:
- receiving the audio stream, at a data-processing system, the audio stream including a first speech waveform produced by a first party on a call, and a second speech waveform produced by a second party on the call;
- determining whether a first segment or a second segment of the first speech waveform comprises non private information by analyzing the audio content of a segment of the second speech waveform against a model that describes private information, wherein the model is represented by acoustic signatures in which non-prose-related characteristics of speech are stored; and
- retaining only the first segment when the first segment, but not the second segment, is determined to comprise non-private information.

13. The method of claim 12 wherein the determining whether the first segment comprises non-private information is based at least in part upon a matching of the content of the first segment with one or more keywords or key phrases.

14. The method of claim 13 wherein the determining whether the first segment comprises non-private information is also based at least in part upon a time location of the first segment within the first speech waveform.

15. The method of claim 14 wherein the time location of the first segment is within the final N seconds of the first speech waveform, N being a positive number that is less than the length in seconds of the first speech waveform.

16. A method for processing private audio content in an audio stream, comprising:
- receiving the audio stream, at a data-processing system, the audio stream including a first speech waveform produced by a first party on a call, and a second speech waveform produced by a second party on the call;
- creating a model describing the private audio content by generating an acoustic signature of the audio stream, in which at least one non-prose-related characteristic of speech is stored and in which intelligible prose has been omitted from the acoustic signature; and
- retaining the acoustic signature as a representation of the audio stream.

17. The method of claim 16 wherein the acoustic signature embodies at least one characteristic of the audio stream that is selected from the group consisting of call length, time location of one or more silent passages, and intonation.

18. The method of claim 16 wherein generating an acoustic signature of the audio stream comprises low-pass—filtering the audio stream.

19. The method of claim 16 wherein generating an acoustic signature of the audio stream comprises calculating pitch and energy of the audio stream.

20. The method of claim 16 further comprising retaining a first segment of the first waveform in unaltered form, the first segment having been determined as comprising non-private information.

* * * * *